H. MUELLER.
FAUCET.
APPLICATION FILED OCT. 30, 1909.
955,531.
Patented Apr. 19, 1910.
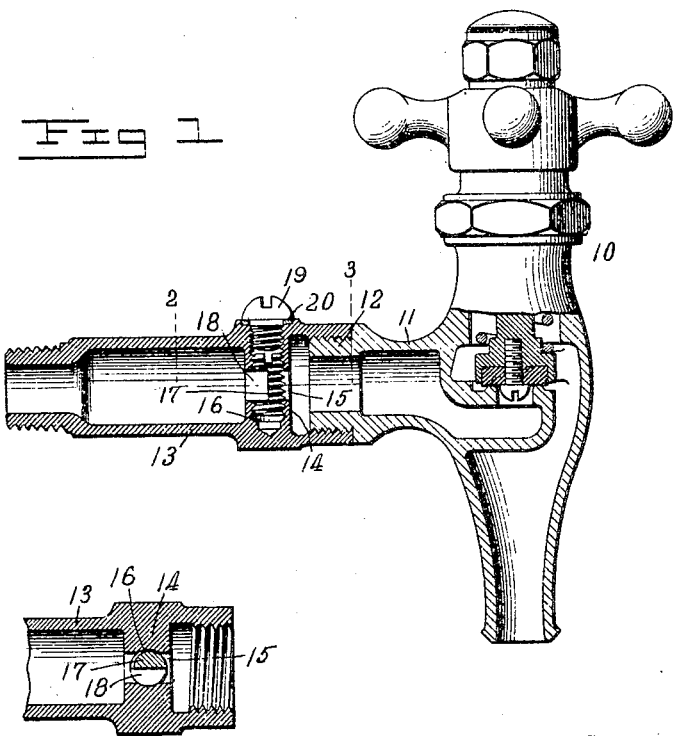
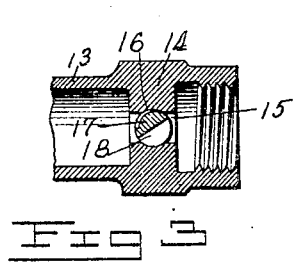
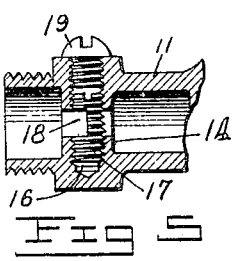
Inventor
Henry Mueller

UNITED STATES PATENT OFFICE.

HENRY MUELLER, OF DECATUR, ILLINOIS, ASSIGNOR TO THE H. MUELLER MANUFACTURING COMPANY, OF DECATUR, ILLINOIS, A CORPORATION OF ILLINOIS.

FAUCET.

955,531.  Specification of Letters Patent.  Patented Apr. 19, 1910.

Application filed October 30, 1909. Serial No. 525,568.

*To all whom it may concern:*

Be it known that I, HENRY MUELLER, a citizen of the United States, residing at Decatur, in the county of Macon and State of Illinois, have invented new and useful Improvements in Faucets, of which the following is a specification.

This invention relates to faucets; and has for its object to provide a simple, cheap and efficient means for regulating the quantity and pressure of fluid passing therethrough.

It is well known that faucets are often attached to high pressure service and when opened, unless care is taken, the fluid, especially if a liquid, pours forth with great rapidity and in large quantities. This rapid and forcible flow of liquid is not always desirable and often objectionable, and to lessen the flow, the structure hereinafter described has been devised and by its means the pressure and quantity of fluid passing through the faucet may be reduced and regulated with great accuracy between the extremes of full head and a substantially absolute cut-off.

To this end the invention consists of the novel construction, combination and arrangement of parts hereinafter described, pointed out in the claims and illustrated in the accompanying drawings, in which, Figure 1 is a vertical sectional view through a faucet and the adjustable regulating device; Fig. 2, a sectional view on the line 2—3 of Fig. 1, showing the regulating device open to its fullest extent; Fig. 3, a similar view with the regulating device turned to partly close the passage-way; Fig. 4, a perspective view of the cut-off plug, and Fig. 5, a modified view of the invention.

Similar reference characters are used to indicate the same parts in all the figures.

In the accompanying drawing, 10 indicates a faucet of any suitable type, a self-closing spring faucet being shown in the drawing by way of illustration. The faucet is provided as usual with a shank 11, having a threaded end 12 for attaching it to a source of fluid supply.

In the preferred form of the invention illustrated in Figs. 1 to 4, a supplemental shank 13 is screwed at one end on the shank 11 of the faucet, and at its other end is formed with a threaded stem for attaching it to a pipe or other object containing fluid. Within the shank 13 is a diaphragm 14 having a perforation 15 therethrough the diameter of which is less than the bore of the shank, and its axis coincident with the same or not, as desired.

Bored or otherwise formed in the shank 13 at the diaphragm 14 and partly across the latter is a hole 16 at a right angle to the axis of the perforation 15 and of slightly greater diameter. The hole 16 extends from one side of the shank 13 nearly to the opposite side and is threaded, preferably throughout its length, for the reception of a cut-off plug 17 shorter than the hole and having a notch 18 in one side thereof, the width of the notch being equal to the diameter of the perforation 15. The screw-plug 17 is preferably made with a nick at one end for the insertion of a screw-driver or other tool to turn the same, and when screwed into the hole 16 until its notch 18 is in line with the perforation 15, the nicked head thereof will be some distance within said hole so that a headed screw 19 may also be screwed thereinto, the head of the screw pressing against a packing washer 20 seated in a countersink at the outer end of the hole to prevent leakage. The notch 18 in the screw-plug 17 extends approximately halfway through the body thereof, so that when the plug is in the position represented in Fig. 2, the perforation 15 will be open to its full extent, but on giving it a slight turn either to the right or left, the pass through the perforation will be reduced, as shown in Fig. 3, and thus lessen the pressure of fluid and the quantity thereof entering the faucet.

In using the device after the shank has been coupled to a source of fluid supply, if the screw-plug be opened to its fullest extent, as in Fig. 2, and the pressure and flow of fluid through the faucet be then too great, the screw 19 is removed and a screw-driver or other tool is inserted in the nick of the screw-plug and the latter turned to lessen the size of the passage-way through the diaphragm until the desired pressure and amount of flow passes out of the faucet when opened, after which the screw 19 is returned to place and screwed firmly against the packing.

If at any time it be desired to remove the faucet for repairs or other reasons, the screw plug should be turned until the notch 18 lies across the perforation 15, as shown in Fig. 1, thereby cutting off entirely the passage of fluid through the perforation 15.

It is to be noted that the construction of this device is very simple, and the chance of leakage is reduced to the minimum as there is but one opening from the interior of the shank and this is filled by the screw plug 17 packed securely by means of the washer 20 and screw 19. It is possible that when the screw-plug is turned to cut off entirely any flow through the perforation 15, a little fluid might escape between the threads of the plug and the hole, but as the plug is made slightly larger than the perforation the escape of water in the manner described will be so exceedingly small as to be negligible.

Instead of mounting the regulating device in a separate shank, the shank 11 of the faucet may be slightly lengthened, as in Fig. 5, and the diaphragm 14 cast integral therewith or inserted therein, as desired.

Having thus described my invention what I claim is:

1. In a faucet having a valve and a shank, a perforated diaphragm in said shank, a threaded plug screwed into said diaphragm at a right angle to the axis of the perforation and across the same, said plug being notched on one side coincident to said perforation, and means by which said plug may be turned.

2. In a faucet having a valve and a shank, a transverse diaphragm in said shank provided with a through perforation, a threaded plug screwed into a hole in said diaphragm from one side and at a right angle to the axis of and across the perforation, said plug having a notch in one side coincident to said perforation to regulate the flow of fluid therethrough, and a screw threaded in the plug hole.

3. In a removable shank for faucets, an integral transverse diaphragm therein provided with an axial perforation, a threaded plug of greater diameter than the perforation screwed into a radial hole in said diaphragm and across said perforation, said plug having a notch in one side coincident with the perforation, means by which said plug may be turned to regulate the flow of water through said perforation, and a screw threaded into said hole to cover the plug.

4. A faucet having a valve and a threaded shank, combined with a removable shank attached thereto at one end and having on its opposite end attaching means similar to that on the valve shank, a pressure regulating device in the removable shank comprising an axially perforated transverse diaphragm having a threaded radial hole therein opening at one side only of said removable shank, an adjustably threaded plug fitted in said hole and provided with a notch coincident with said perforation, the outer end of said plug entering the hole below the surface of the shank and provided with means for rotating the same, and a cap screw threaded in said hole for closing the same.

In testimony whereof I have hereunto set my hand in presence of two subscribing witnesses.

HENRY MUELLER.

Witnesses:
F. L. RIGGIN,
W. R. BIDDLE.